(12) United States Patent
Kawakubo (10) Patent No.: US 10,279,835 B2
(45) Date of Patent: May 7, 2019

(54) STEERING SYSTEM

(71) Applicant: JTEKT CORPORATION, Osaka-shi, Osaka (JP)

(72) Inventor: Akitake Kawakubo, Nara (JP)

(73) Assignee: JTEKT CORPORATION, Osaka (JP)

(*) Notice: Subject to any disclaimer, the term of this patent is extended or adjusted under 35 U.S.C. 154(b) by 302 days.

(21) Appl. No.: 15/232,963

(22) Filed: Aug. 10, 2016

(65) Prior Publication Data

US 2017/0050666 A1 Feb. 23, 2017

(30) Foreign Application Priority Data

Aug. 21, 2015 (JP) ................. 2015-163914

(51) Int. Cl.
 *B62D 3/12* (2006.01)
 *F16H 55/28* (2006.01)

(52) U.S. Cl.
 CPC ............ *B62D 3/126* (2013.01); *B62D 3/12* (2013.01); *B62D 3/123* (2013.01); *F16H 55/28* (2013.01); *F16H 55/283* (2013.01); *F16H 2055/281* (2013.01)

(58) Field of Classification Search
 CPC ... B62D 3/123; B62D 3/126; F16H 2055/281; F16H 55/28; F16H 55/283
 USPC ..................................................... 74/422
 See application file for complete search history.

(56) References Cited

U.S. PATENT DOCUMENTS

| | | | | |
|---|---|---|---|---|
| 7,665,747 B2* | 2/2010 | Arlt | ............ | B62D 3/12 280/93.514 |
| 7,798,504 B2* | 9/2010 | Hirose | ............ | B62D 3/12 280/93.514 |
| 7,908,748 B2* | 3/2011 | Nishikubo | ............ | B62D 3/123 29/445 |
| 8,429,991 B2* | 4/2013 | Kim | ............ | B62D 3/12 180/427 |
| 8,555,741 B2* | 10/2013 | Arlt | ............ | B62D 3/12 74/388 PS |

(Continued)

FOREIGN PATENT DOCUMENTS

| | | |
|---|---|---|
| JP | 2012-020681 A | 2/2012 |
| JP | 2012-041018 A | 3/2012 |
| JP | 2012-188005 A | 10/2012 |

OTHER PUBLICATIONS

Feb. 10, 2017 Extended European Search Report issued in Patent Application No. 16184596.1.

*Primary Examiner* — William Kelleher
*Assistant Examiner* — Gregory Robert Weber
(74) *Attorney, Agent, or Firm* — Oliff PLLC (57) ABSTRACT

In a steering system, a guide member faces the rack shaft on the opposite side of the rack shaft from the pinion shaft, and an opposed member faces the guide member at a first distance. The rack shaft is supported by the first rack bush so as to be slidable in the axial direction. The rack shaft is supported so as to be slidable in the axial direction X at a position closer to the guide member than the first rack bush is by the second rack bush disposed away from the inner surface. An elastic member that can be elastically deformed is disposed between the inner surface and the second rack bush. The second rack bush has an opposed portion disposed on the opposite side of the rack shaft from the pinion shaft and facing the inner surface at a second distance that is larger than the first distance.

2 Claims, 5 Drawing Sheets

(56) References Cited

U.S. PATENT DOCUMENTS

| | | | |
|---|---|---|---|
| 8,794,093 B2* | 8/2014 | Bareis | B62D 3/123 74/388 PS |
| 2006/0075840 A1 | 4/2006 | Saito et al. | |
| 2008/0022796 A1* | 1/2008 | Kim | B62D 3/12 74/422 |
| 2012/0248724 A1* | 10/2012 | Watanabe | B62D 3/12 280/93.514 |
| 2014/0216183 A1* | 8/2014 | Nakayama | F16C 35/02 74/29 |

* cited by examiner

STEERING SYSTEM

INCORPORATION BY REFERENCE

The disclosure of Japanese Patent Application No. 2015-163914 filed on Aug. 21, 2015 including the specification, drawings and abstract is incorporated herein by reference in its entirety.

BACKGROUND OF THE INVENTION

1. Field of the Invention

The invention relates to a steering system.

2. Description of Related Art

A rack that meshes with a pinion of a pinion shaft is formed on a rack shaft of a rack and pinion steering system described in Japanese Patent Application Publication No. 2012-188005 (JP 2012-188005 A). The pinion shaft is supported by a gear housing. The rack shaft is inserted into a through hole that runs through the gear housing. Both ends of the rack shaft are coupled to wheels through a ball joint, etc. The pinion and the rack convert the rotational motion of a steering wheel into an axial motion of the rack shaft. The rack shaft is pressed against the pinion shaft by a rack guide from the back of the rack shaft, or the opposite side of the rack shaft from the pinion shaft. A first fitting portion and a second fitting portion are provided in the through hole in the gear housing. A rack shaft bush is fitted into the first fitting portion, and a rack bush is fitted into the second fitting portion. The rack bush is disposed closer to the rack guide than the rack shaft bush is.

In the rack and pinion steering system described in JP 2012-188005 A, the rack bush fitted into the second fitting portion of the gear housing slides with the rack shaft when the rack shaft moves in an axial direction. Accordingly, the rack bush, for a long period of time, bears a pressing force against the gear housing, which is generated because the rack bush is sandwiched between the gear housing and the rack shaft, and a load such as a sliding force generated by the sliding friction between the rack bush and the rack shaft.

In the rack shaft, particularly, backlash is likely to occur at a portion pressed by the guide member such as the rack guide. Accordingly, the rack bush disposed closer to the guide member than the rack shaft bush is, has a function to absorb the backlash. When a vehicle travels on a rough road or a wheel runs onto a curb, and a large load such as reverse input is momentarily applied to the rack shaft through wheels, the large load is likely to be applied to the rack bush disposed close to the guide member.

If a long term load or a sudden large load is applied to the rack bush disposed close to the guide member, distortion or abrasion may occur, which causes deterioration of the rack bush.

SUMMARY OF THE INVENTION

One of the objects of the invention is to provide a steering system that suppresses deterioration of a rack bush disposed close to a guide member.

A characteristics of a steering system according to an aspect of the invention includes: a pinion shaft including pinion teeth and rotating when a steering member is operated; a rack shaft having an axial direction that intersects with the pinion shaft and in which a plurality of rack teeth meshing with the pinion teeth is formed side by side in the axial direction; a housing accommodating the rack shaft; a guide member facing the rack shaft on the opposite side of the rack shaft from the pinion shaft and guiding the movement of the rack shaft in the axial direction; an opposed member attached to the housing on the opposite side of the guide member from the rack shaft and facing the guide member at a first distance; a biasing member compressed between the opposed member and the guide member and urging the rack shaft toward the pinion shaft via the guide member; a first rack bush disposed between an inner surface of the housing and the rack shaft and supporting the rack shaft such that the rack shaft is slidable in the axial direction; a second rack bush supporting the rack shaft at a position closer to the guide member in the axial direction than the first rack bush is such that the rack shaft is slidable in the axial direction and disposed away from the inner surface, the second rack bush having an opposed portion disposed on the opposite side of the rack shaft from the pinion shaft and facing the inner surface at a second distance that is larger than the first distance; and an elastic member disposed between the inner surface and the second rack bush and that can be elastically deformed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
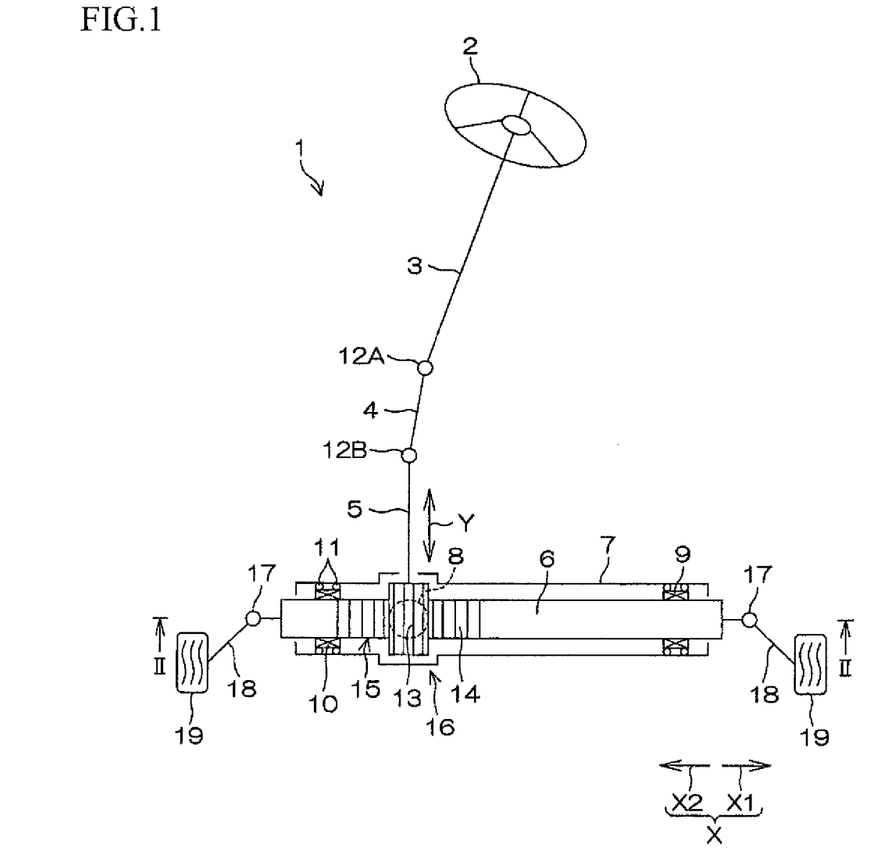
FIG. 1 is a schematic front view of a steering system according to an embodiment of the invention.

Hereinafter, an embodiment of the invention will be described with reference to the accompanying drawings. FIG. 1 is a schematic front view of a steering system 1 according to an embodiment of the invention. Referring to FIG. 1, a steering system 1 mainly includes a steering member 2, a steering shaft 3, an intermediate shaft 4, a pinion shaft 5, a rack shaft 6, a housing 7, a guide mechanism 8, a first rack bush 9, a second rack bush 10, and an elastic member 11. In FIG. 1, the guide mechanism 8 is disposed farther away from the viewer than the rack shaft 6, and is shown by a dashed line.

As the steering member 2, for example, a steering wheel can be used. One end of the steering shaft 3 is coupled to the steering member 2. The other end of the steering shaft 3 is coupled to one end of the intermediate shaft 4 via a universal joint 12A. The other end of the intermediate shaft 4 is coupled to one end of the pinion shaft 5 via a universal joint 12B. A plurality of pinion teeth 13 is integrally formed on the outer peripheral surface of the other end of the pinion shaft 5.

The rack shaft 6 is formed into a generally cylindrical shape which extends in the right-left direction in FIG. 1, or the width direction of a vehicle. In this case, the right-left direction in which the rack shaft 6 extends is defined as an axial direction X serving as a predetermined direction, The axial direction X intersects with a direction (pinion axial direction) Y in which the pinion shaft 5 extends. Hereinafter, with the position of the steering system 1 used as a reference in FIG. 1, the reference symbol X1 denotes the right side of the axial direction X that extends in the right-left direction, and the reference symbol X2 denotes the left side of the axial direction X.

The rack shaft 6 includes a rack teeth formation area 15 in which a plurality of rack teeth 14 is formed side by side in the axial direction X. The rack teeth formation area 15 is located toward the left side X2 in the rack shaft 6. The rack teeth 14 mesh with the pinion teeth 13. The rack shaft 6 and the pinion shaft 5 constitute a rack and pinion mechanism 16. The rack shaft 6 is accommodated in a housing 7. The housing 7 is fixed to a vehicle body (not shown).

Two ends of the rack shaft 6 in the axial direction X are projected from the housing 7, and are coupled to steered wheels 19 via coupling members 17 such as ball joints and tie rods 18. The pinion shaft 5 rotates together with the steering shaft 3 and the intermediate shaft 4 in response to rotation of the steering member 2. The rotation transferred to the pinion shaft 5 is converted into movement of the rack shaft 6 in the axial direction X by meshing of the pinion teeth 13 and the rack teeth 14. The movement of the rack shaft 6 in the axial direction X causes the steered wheels 19 to be steered.

Figure 2:
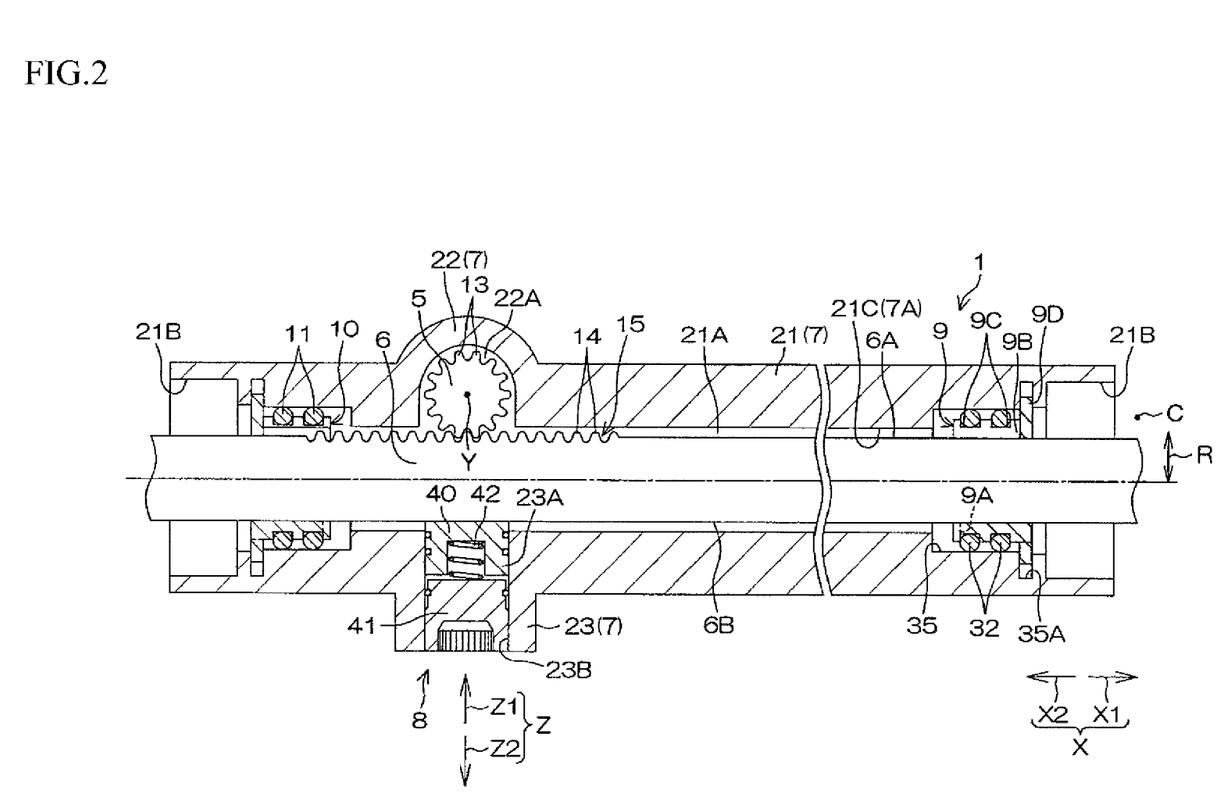
FIG. 2 is a cross-sectional view taken along the line II-II in FIG. 1, and a schematic cross-sectional view of a surrounding area of a rack shaft.

FIG. 2 is a cross-sectional view taken along the line II-II in FIG. 1, and a schematic cross-sectional view of a surrounding area of the rack shaft 6. In FIG. 2, for the purpose of convenience of explanation, the pinion shaft 5 and the rack shaft 6 are not hatched (the same applies to FIG. 3 and FIG. 6 to be described later). Referring to FIG. 2, the housing 7 includes a tubular rack housing 21, a tubular pinion housing 22, and a tubular accommodating portion 23. The rack housing 21 extends in the axial direction X. The pinion housing 22 extends in a direction intersecting with the axial direction X. The accommodating portion 23 extends in a direction (orthogonal direction) Z that is orthogonal to a pinion shaft direction Y and parallel to a radial direction R of the rack shaft 6. An internal space 21A of the rack housing 21, an internal space 22A of the pinion housing 22, and an internal space 23A of the accommodating portion 23 communicate with each other. A portion of the pinion shaft 5 in which pinion teeth 13 are formed is accommodated in the internal space 22A of the pinion housing 22. The accommodating portion 23 is located on the opposite side of the rack shaft 6 from the pinion shaft 5.

The rack housing 21 has the internal space 21A extending therethrough in the axial direction X. The rack housing 21 has a pair of openings 21B that exposes the internal space 21A to the outside from both ends in the axial direction X. The rack shaft 6 is accommodated in the internal space 21A of the rack housing 21. A first rack bush 9 extending in the axial direction X is made of resin and formed into a cylindrical shape, and is fitted onto the rack shaft 6. The first rack bush 9 includes cut portions 9A and cut portions 9B such that the cut portions 9A and the cut portions 9B are alternately disposed in the circumferential direction C, The cut portions 9A extend from the end portion on the right side X1 to the left side X2. The cut portions 9B extend from the end portion on the left side X2 to the right side X1. A plurality of annular grooves 9C is formed on the outer peripheral surface of the first rack bush 9 at intervals in the axial direction X. An O-ring 32 is fitted into each of the annular grooves 9C. In the present embodiment, two O-rings 32 are provided since two annular grooves 9C are provided.

The first rack bush 9 is fitted onto the rack shaft 6 as described above, Specifically, the end portion of the rack shaft 6 on the right side X1 is inserted through the first rack bush 9. In this case, the first rack bush 9 is disposed between an inner peripheral surface 21C of the rack housing 21 and the rack shaft 6. The inner peripheral surface 21C of the rack housing 21 constitutes a part of an inner surface 7A of the housing 7.

With respect to the first rack bush 9, a first holding portion 35 for holding the first rack bush 9 is provided on the inner peripheral surface 21C of the rack housing 21. The first holding portion 35 is a cylindrical surface adjacent to the opening 21B on the right side X1 and located on the left side X2 of the opening 21B. The O-rings 32 abut against the first holding portion 35 from the inner side in the radial direction R, Accordingly, the first rack bush 9 is reduced in diameter by the O-rings 32. Specifically, a load is applied to the first rack bush 9 from the outer side in the radial direction R, whereby the first rack bush 9 is reduced in diameter by narrowing down portions where the cut portions 9A and the cut portions 9B are formed. Therefore, the inner peripheral surface of the first rack bush 9 is pressed against the outer peripheral surface 6A of the rack shaft 6, and the rack shaft 6 is supported by the first rack bush 9 so as to be slidable in the axial direction X.

A fitting groove 35A recessed outward in the radial direction R is formed in the end portion of the first holding portion 35 on the right side X1. A flange portion 9D extending outward in the radial direction R is provided in the end portion of the first rack bush 9 on the right side X1. The flange portion 9D of the first rack bush 9 is fitted into the fitting groove 35A of the first holding portion 35. Accordingly, the movement of the first rack bush 9 in the axial direction X is restricted.

Figure 3:
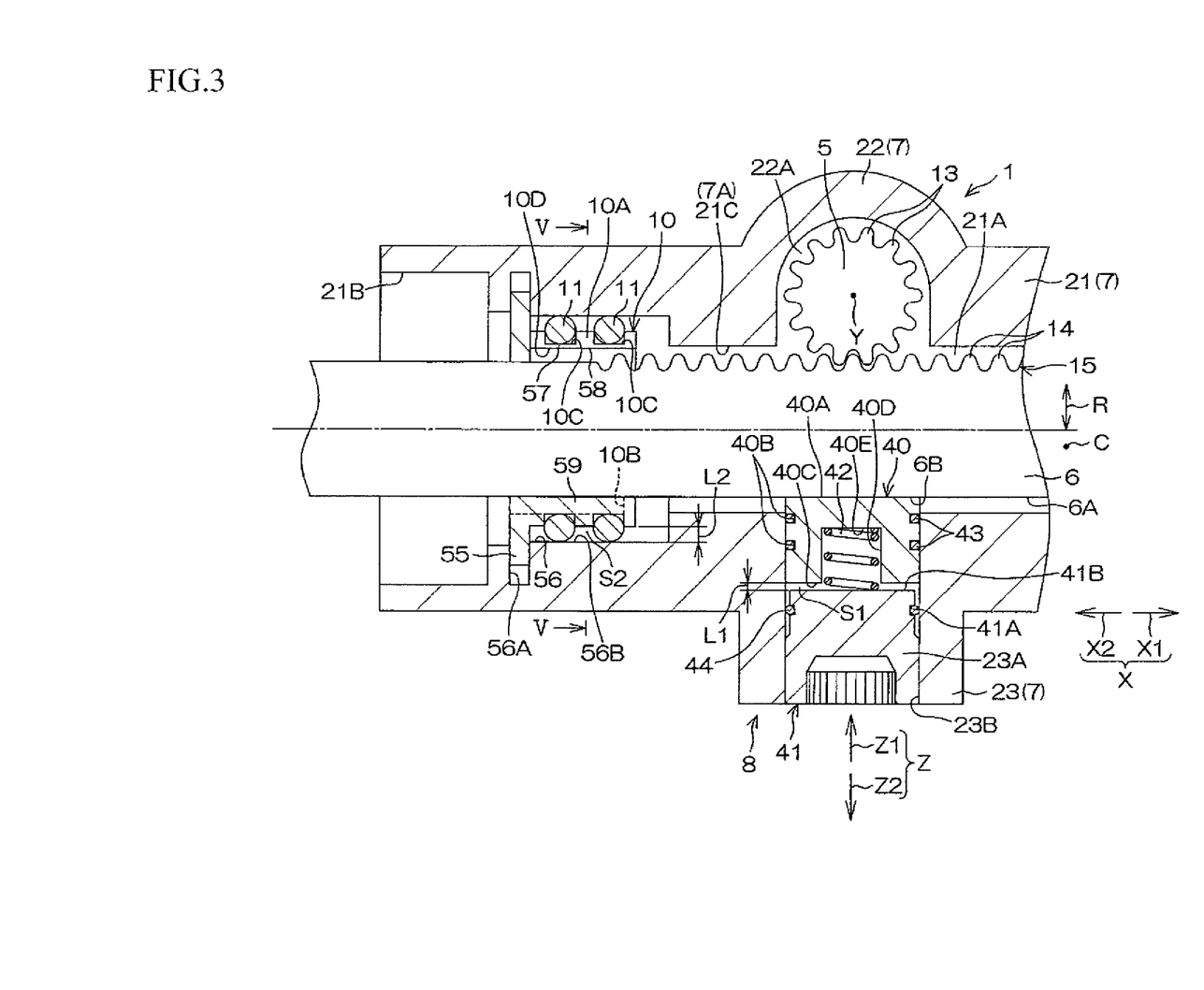
FIG. 3 is an enlarged view of a surrounding area of a guide mechanism and a second rack bush in FIG. 2.

Here, in the area that is on the opposite side of the rack shaft 6 from the pinion shaft 5, a direction toward the rack shaft 6 and is parallel to the orthogonal direction Z is referred to as a first side Z1, and a direction away from the rack shaft 6 and is parallel to the orthogonal direction Z is referred to as a second side Z2. An opening 23B exposing the internal space 23A of the accommodating portion 23 to the outside of the housing 7 is provided in the end portion of the accommodating portion 23 on the second side Z2. FIG. 3 is an enlarged view of a surrounding area of the guide mechanism 8 and the second rack bush 10 in FIG. 2. With reference to FIG, 3, the guide mechanism 8 guides the movement of the rack shaft 6 in the axial direction X. The guide mechanism 8 includes a guide member 40, an opposed member 41, and a biasing member 42 which are accommodated in the accommodating portion 23.

The guide member 40 is a support yoke in a generally cylindrical shape that extends in the orthogonal direction Z, for example. The guide member 40 faces the rack shaft 6 on the opposite side of the rack shaft 6 from the pinion shaft 5 (the lower side in FIG. 3). Specifically, the guide member 40 faces a portion 6B formed in an area of the outer peripheral surface 6A of the rack shaft 6, which faces a rack teeth formation area 15 in the axial direction X, and is located on the second side Z2 of the rack shaft 6. An end face 40A of the guide member 40 on the first side Z1 is curved along the portion 6B of the outer peripheral surface 6A of the rack shaft 6.

A single or a plurality of annular groove(s) 40B is formed on the outer peripheral surface of the guide member 40. In the present embodiment, two annular grooves 40B are arranged at intervals in the orthogonal direction Z. An O-ring 43 is accommodated in each of the annular grooves 40B. The outside diameter of the guide member 40 is slightly smaller than the inside diameter of the accommodating portion 23. The guide member 40 can move in the orthogonal direction Z within the internal space 23A as the O-ring 43 slides along the inner peripheral surface of the accommodating portion 23.

The opposed member 41 is a yoke plug in a generally cylindrical shape that extends in the orthogonal direction Z. The opposed member 41 is attached to the accommodating portion 23 of the housing 7 so as to close the opening 23B on the opposite side of the guide member 40 from the rack shaft 6 (the lower side in FIG. 3). The opposed member 41 may be attached to the accommodating portion 23 by being threadedly fixed to the accommodating portion 23 around the opening 23B. In this state, a clearance S1 in the orthogonal direction Z is provided between an end face 41B of the opposed member 41 on the first side Z1 and an end face 40C of the guide member 40 on the second side Z2. The opposed member 41 faces the guide member 40 and is located on the second side Z2 of the guide member 40 at a first distance L1 in the orthogonal direction Z.

A single or a plurality of annular groove(s) 41A is formed on the outer peripheral surface of the opposed member 41. In the present embodiment, one annular groove 41A is provided, and one 0-ring 44 is accommodated in the annular groove 41A. The biasing member 42 can be elastically deformed in the orthogonal direction 4 and is, for example, a coil spring. The biasing member 42 is disposed between the guide member 40 and the opposed member 41 so as to be compressed in the orthogonal direction Z, Specifically, a recess 40D recessed toward the first side Z1 is formed in an end face 40C of the guide member 40 on the second side Z2. The biasing member 42 is disposed between a bottom face 40E of the recess 40D and the end face 41B of the opposed member 41 on the first side Z1 in a compressed state where the entire biasing member 42 is accommodated in the recess 40D. In this state, the biasing member 42 urges the rack shaft 6 toward the pinion shaft 5 via the guide member 40. Accordingly, the rack shaft 6 is supported by the guide member 40 so as to be slidable in the axial direction X, and meshing between the rack teeth 14 of the rack shaft 6 and the pinion teeth 13 of the pinion shaft 5 is maintained. The guide member 40 guides the movement (sliding) of the rack shaft 6 in the axial direction X.

Figure 4:
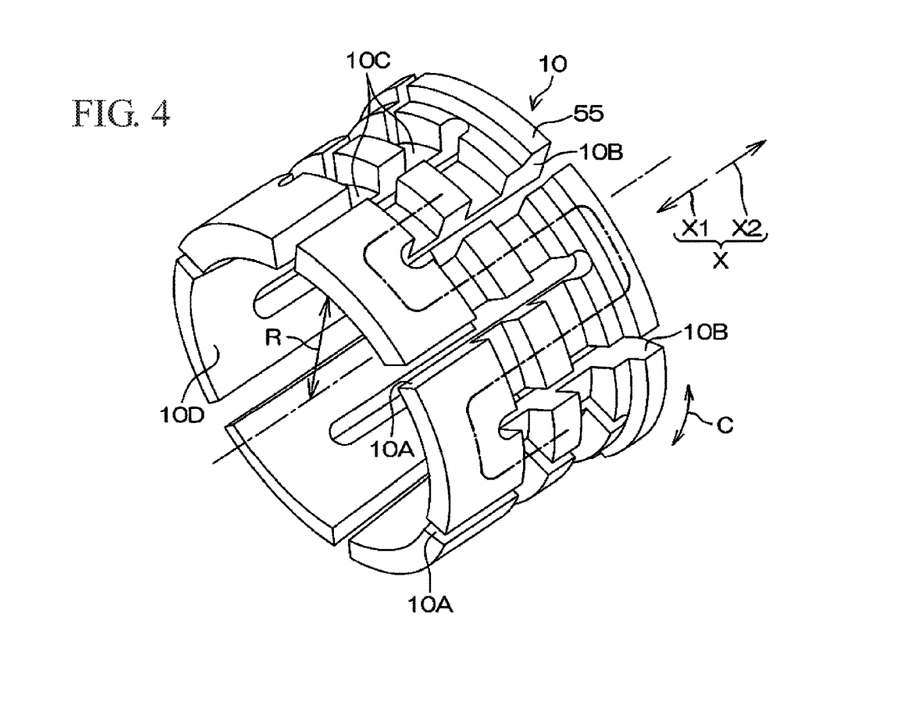
FIG. 4 is a schematic perspective view of the second rack bush.

A sliding-contact plate (not shown) in a curved shape along the end face 40A may be attached to the end face 40A of the guide member 40 on the first side Z1. In this case, the rack shaft 6 slides along the sliding plate when moving in the axial direction X. FIG. 4 is a schematic perspective view of the second rack bush 10. In FIG. 4, the right side X1 coincides with the left side on the sheet facing the viewer, and the left side X2 coincides with the right side on the sheet facing away from the viewer.

With reference to FIG. 4, the second rack bush 10 extending in the axial direction X is made of resin and formed into a cylindrical shape. The second rack bush 10 is fitted onto the rack shaft 6. The second rack bush 10 includes cut portions 10A and cut portions 10B such that the cut portions 10A and the cut portions 10B are alternately disposed in the circumferential direction C. The cut portions 10A extend from the end portion on the right side X1 to the left side X2. The cut portions 10B extend from the end portion on the left side X2 to the right side X1. Therefore, as indicated by an alternate long and short dash line in FIG. 4, the second rack bush 10 extends in the circumferential direction while it is formed in a meandering shape. A plurality of annular grooves 10C is formed on the outer peripheral surface of the second rack bush 10 at intervals in the axial direction X.

With reference to FIG. 3, the elastic member 11 can be elastically deformed in the radial direction R. The elastic member 11 may be an annular elastic body, for example. In this case, the annular elastic body may be an O-ring made of hydrogenated nitrile rubber (HNBR) having higher heat resistance than nitrile rubber (NBR). The number of the elastic members 11 is equal to the number of the annular grooves 10C. In the present embodiment, one elastic member 11 is fitted into each of the two annular grooves 10C. The outer peripheral portion of the elastic member 11 protrudes from the annular groove 10C.

With reference to FIG. 2, the end portion of the rack shaft 6 on the left side X2 is inserted through the second rack bush 10. The second rack bush 10 is disposed on the rack shaft 6 closer to the guide member 40 than the first rack bush 9 is in the axial direction X. In the present embodiment, the second rack bush 10 is disposed on the opposite side (here, the left side X2) of the guide member 40 from the first rack bush 9 in the axial direction X. Unlike the present embodiment, the second rack bush 10 may be fitted onto the rack shaft 6 between the first rack bush 9 and the guide member 40. The second rack bush 10 is also called as a meshing side bush because the second rack bush 10 is disposed closer to a meshing portion of the pinion teeth 13 and the rack teeth 14 than the first rack bush 9 is.

With reference to FIG. 3, the second rack bush 10 is disposed within the internal space 21A of the rack housing 21. With respect to the second rack bush 10, a second holding portion 56 for holding the second rack bush 10 is formed on the inner peripheral surface 21C of the rack housing 21. The second holding portion 56 is a cylindrical surface adjacent to the opening 21B on the left side X2 and is located on the right side X1 of the opening 21B, for example.

The elastic member 11 is disposed between the second holding portion 56 of the inner peripheral surface 21C of the rack housing 21 and the second rack bush 10, and abuts against the second holding portion 56 from the inner side in the radial direction R. The second rack bush 10 is disposed away from the second holding portion 56 in the radial direction R over the entire area in the circumferential direction C. Specifically, the second rack bush 10 floats from the rack housing 21, that is a so-called in a floating state.

The second rack bush 10 is reduced in diameter by the elastic member 11 in the radial direction R. Specifically, a load is applied to the second rack bush 10 from the outer side in the radial direction R. Accordingly, the second rack bush 10 is reduced in diameter by narrowing down portions where the cut portions 10A and the cut portions 10B are formed. The rack shaft 6 is supported by the second rack bush 10 so as to be slidable. The rack shaft 6 is supported by the guide member 40, the first rack bush 9, and the second rack bush 10, or at three points spaced apart from one another in the axial direction X (see FIG. 2).

A flange portion 55 projecting outward in the radial direction R is formed on the end portion of the second rack bush 10 on the left side X2 (see FIG. 4). A fitting groove 56A recessed outward in the radial direction R is formed in the end portion of the second holding portion 56 on the left side X2. The flange portion 55 is fitted into the fitting groove 56A. Accordingly, the movement of the second rack bush 10 in the axial direction X is restricted. In a case where the flange portion 55 is provided on a portion of the second rack bush 10 in the circumferential direction C, and the fitting groove 56A is provided on a portion of the second holding portion 56 in the circumferential direction C, the rotation of the second rack bush 10 in the circumferential direction C is restricted.

Figure 5:
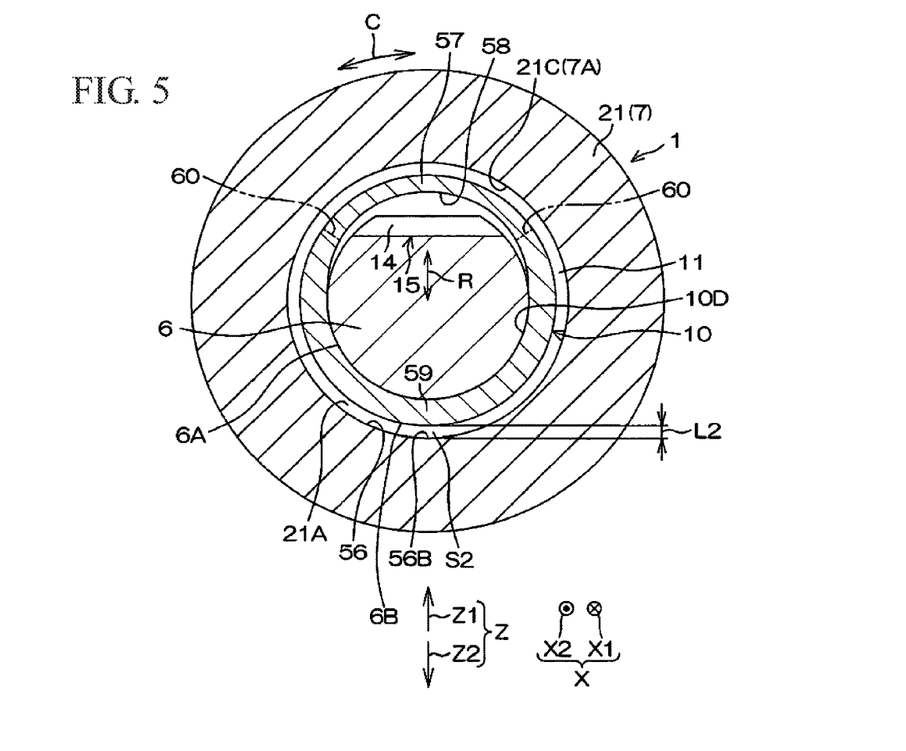
FIG. 5 is a schematic cross-sectional view taken along the line V-V in FIG. 3.

FIG. 5 is a schematic cross-sectional view taken along the line V-V in FIG. 3. In FIG. 5, for the purpose of convenience of explanation, the cut portion 10A and the cut portion 10B (see FIG. 4) are not illustrated. With reference to FIG. 5, the second rack bush 10 includes a thinning portion 57. The thinning portion 57 is formed on a portion of the second rack bush 10 in the circumferential direction C. The thinning portion 57 is disposed on the opposite side of the rack shaft 6 from the guide member 40, or on the pinion shaft 5 side (the upper side in FIG. 5) (see FIG. 3). The thickness of the thinning portion 57 in the radial direction R is thinner than a portion of the second rack bush 10 excluding the thinning portion 57.

With respect to the thinning portion 57, a clearance portion 58 recessed outward in the radial direction R over the entire area in the axial direction X is formed in an area of the inner peripheral surface 10D, which faces the rack teeth formation area 15 in the circumferential direction C. The clearance portion 58 is away from the rack teeth formation area 15 outward in the radial direction R. Therefore, when the rack shaft 6 moves in the axial direction X, the second rack bush 10 does not contact the rack teeth 14. Accordingly, the second rack bush 10 can be disposed closer to the guide member 40. The second rack bush 10 contacts the rack shaft 6 on the opposite side of the rack shaft 6 from the pinion shaft 5, and the elastic member 11 can apply a preload toward the first side Z1 to the rack shaft 6.

As described above, the rack shaft 6 is supported so as to be slidable by the first rack bush 9 disposed between the inner peripheral surface 21C of the rack housing 21 and the rack shaft 6 (see FIG. 2). Furthermore, the rack shaft 6 is supported so as to be slidable by the second rack bush 10 disposed between the inner peripheral surface 21C of the rack housing 21 and the rack shaft 6. Backlash is likely to occur particularly in a portion of the rack shaft 6 which has been pressed by the guide member 40. However, backlash of the rack shaft 6 is suppressed by the second rack bush 10 located closer to the guide member 40 than the first rack bush 9 is in the axial direction X.

The biasing member 42 urges the guide member 40, which is assisted by the elastic member 11 fitted into the annular groove 10C of the second rack bush 10 located closer to the guide member 40 than the first rack bush 9 is. Accordingly, backlash of the rack shaft 6 is further suppressed. The elastic member 11 applies a preload toward the first side Z1 to the rack shaft 6, Thus, it is possible to suppress wobble of the rack shaft 6, which is caused by the guide member 40 that supports the rack shaft 6 only from the second side Z2 that is one side in the orthogonal direction Z.

The second rack bush 10 is disposed away from the inner peripheral surface 21C of the rack housing 21. Accordingly, the second rack bush 10 is less likely to bear a pressing force against the inner peripheral surface 21C of the rack housing 21, the pressing force being generated because the second rack bush 10 is sandwiched between the rack shaft 6 and the rack housing 21, Furthermore, the elastic member 11 disposed between the inner peripheral surface 21C of the rack housing 21 and the second rack bush 10 is elastically deformed. This allows a force from the rack shaft 6 and the rack housing 21 to be absorbed. Therefore, it is possible to suppress generation of an excessive sliding force, which is caused by the pressing force, between the second rack bush 10 and the rack shaft 6.

With reference to FIG. 5, in the second rack bush 10, a portion facing the second holding portion 56 and located on the first side Z1 in the orthogonal direction Z is referred to as an opposed portion 59, The opposed portion 59 is disposed on the opposite side of the rack shaft 6 from the pinion shaft 5 (see FIG. 3). The opposed portion 59 is disposed on the same position as the guide member 40 in the circumferential direction C. A clearance S2 in the orthogonal direction Z is formed between the opposed portion 59 and a portion 56B, The opposed portion 59 is located at a second distance L2 from the portion 56B facing the opposed portion 59 and located on the second side Z2 in the second holding portion 56. The second distance L2 between the second holding portion 56 and the second rack bush 10 is larger than the first distance L1 (see FIG. 3).

Figure 6:
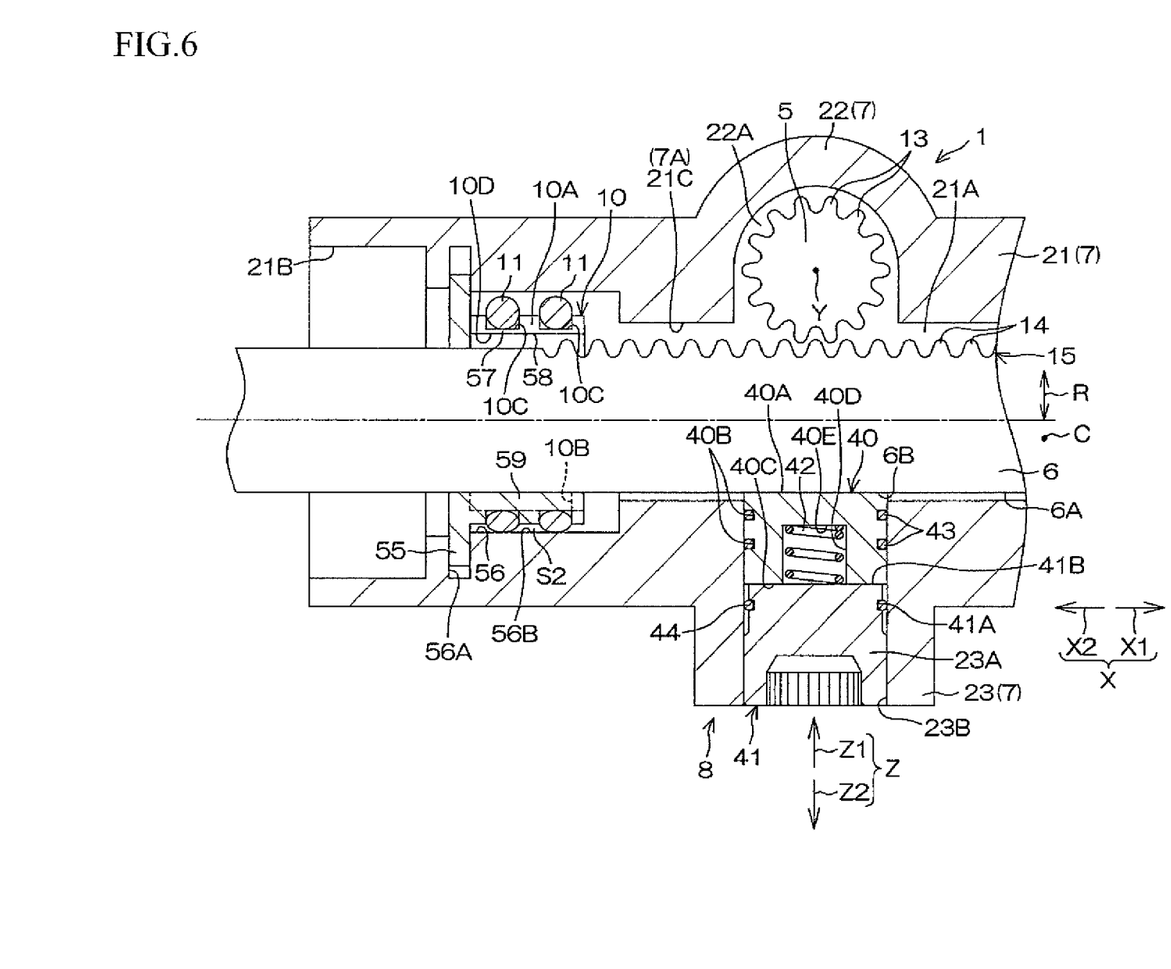
FIG. 6 is a view illustrating a state in which a large load is applied to a rack shaft in FIG. 1

Here, with reference to FIG. 1, when a vehicle travels on a rough road or a steered wheel 19 runs onto a curb, a large load, what is called a reverse input, may be transferred to the rack shaft 6 via the steered wheel 19, the tie rod 18, and the coupling member 17 in this order, As described above, the second distance L2 is larger than the first distance L1. Therefore, when the force component in the radial direction R (orthogonal direction Z) is generated by the large load around the guide member 40, as shown in FIG. 6, the guide member 40 and the opposed member 41 contact with each other before the opposed portion 59 of the second rack bush 10 and the second holding portion 56 of the rack housing 21 contact with each other. In the state of FIG. 6, the clearance S1 in the orthogonal direction Z is removed between the opposed member 41 and the guide member 40 (see FIG. 3). However, the clearance S2 in the orthogonal direction Z between the opposed portion 59 and the portion 56B of the second holding portion 56 is maintained. That is, the elastic member 11 is not compressed to be completely fitted into the annular groove 10C. Bottom fitting in which the second rack bush 10 abuts against the inner peripheral surface 21C of the rack housing 21 does not occur, Accordingly, the large load may be applied to the guide member 40 and the opposed member 41, and may not be applied to the second rack bush 10.

As a result, deterioration of the second rack bush 10 disposed close to the guide member 40 can be suppressed. In this way, a load is less likely to be applied to the second rack bush 10. As described in the present embodiment, even though resin is used for the second rack bush 10, creep or abrasion is less likely to occur in the second rack bush 10. This allows the second rack bush 10 to keep resin properties such as rigidity after being used for a long period of time, that is, after exceeding the endurance limit. By using the second rack bush 10 made of resin, the slapping sound to be generated by the second rack bush 10 and the rack shaft 6 can be suppressed. Even after exceeding the endurance limit, a preload toward the rack shaft 6, which is applied by the elastic member 11, can be maintained.

The second rack bush 10 is disposed on the opposite side of the guide member 40 from the first rack bush 9 in the axial direction X. This allows the rack shaft 6 to be urged toward the pinion shaft 5 in a state where the rack shaft 6 is supported by the first rack bush 9 and the second rack bush 10 in the axial direction X in a well-balanced manner. As a result, backlash of the rack shaft 6 can be further suppressed. Because the steering system 1 is used for a long period of time, the contact portion between the rack shaft 6 and the guide member 40, or the meshing portion between the pinion teeth 13 and the rack teeth 14 wears, whereby the first distance L1 may be increased. As an example, the length of the first distance L1 is 60 μm in an initial control state immediately after the steering system 1 is assembled, and is approximately 200 μm after exceeding the endurance limit. Accordingly, in consideration of the abrasion described above, by setting the length of the second distance L2 to be larger than 200 μm, for example 300 μm, it is possible to prevent a large load from being applied to the second rack bush 10 even after exceeding the endurance limit.

The invention is not limited to the embodiment described above, and various modifications can be made without departing from the scope defined by the appended claims. For example, the second rack bush 10 may be formed to be cut in the middle in the circumferential direction C by removing the thinning portion 57, and may be a C-shape viewed from the axial direction X. In this case, the second rack bush 10 has a pair of end portions 60 in the circumferential direction C, as indicated by a long dashed double-short dashed line in FIG. 5.

What is claimed is:

1. A steering system comprising:
a pinion shaft including pinion teeth and rotating when a steering member is operated;
a rack shaft having an axial direction that intersects with the pinion shaft and in which a plurality of rack teeth meshing with the pinion teeth is formed side by side in the axial direction;
a housing accommodating the rack shaft;
a guide member facing the rack shaft on an opposite side of the rack shaft from the pinion shaft, the guide member guiding movement of the rack shaft in the axial direction;
an opposed member attached to the housing on an opposite side of the guide member from the rack shaft and facing the guide member at a first distance;
a biasing member compressed between the opposed member and the guide member, the biasing member biasing the rack shaft towards the pinion shaft via the guide member;
a first rack bush disposed between an inner surface of the housing and the rack shaft, the first rack bush supporting the rack shaft such that the rack shaft is slidable in the axial direction;
a second rack bush supporting the rack shaft at a position closer to the guide member in the axial direction than the first rack bush, such that the rack shaft is slidable in the axial direction, the second rack bush separating the rack shaft from the inner surface of the housing by a second distance, the second rack bush having an opposed portion disposed on the opposite side of the rack shaft from the pinion shaft and facing the inner surface at the second distance, the second distance being larger than the first distance such that upon movement of the rack shaft towards the housing in an orthogonal direction, which is orthogonal to the axial direction, the guide member and the opposed member contact each other prior to the opposed portion and the housing contacting each other; and
an elastic member disposed between the inner surface of the housing and the second rack bush, the elastic member being configured to elastically deform.

2. The steering system according to claim 1, wherein the second rack bush is disposed on the opposite side of the guide member from the first rack bush in the axial direction.

* * * * *